E. P. Le BLANC.
Water-Elevators.
No. 155,455. Patented Sept. 29, 1874.
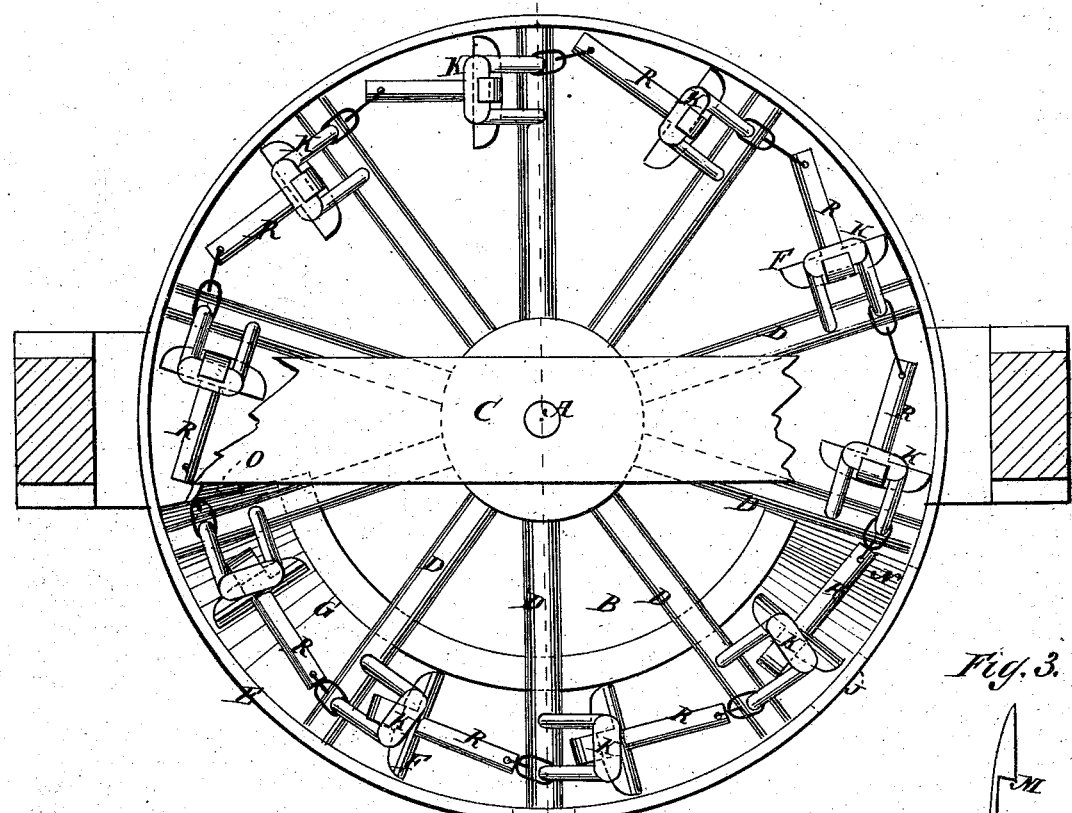
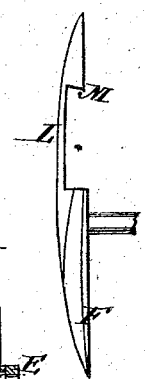
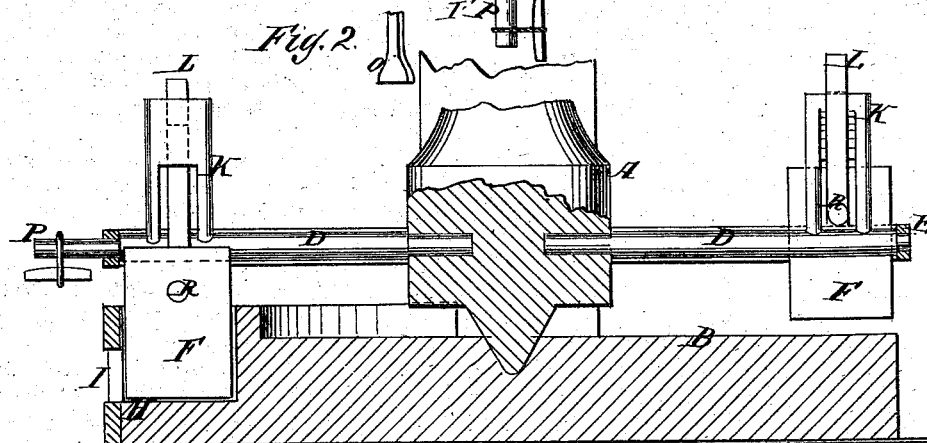
WITNESSES:
E. Wolff
Alex F. Roberts
INVENTOR:
E. P. Le Blanc
BY Munn & Co
ATTORNEYS.

UNITED STATES PATENT OFFICE.

EDEMON P. LE BLANC, OF HOUMA, LOUISIANA.

IMPROVEMENT IN WATER-ELEVATORS.

Specification forming part of Letters Patent No. 155,455, dated September 29, 1874; application filed August 10, 1874.

*To all whom it may concern:*

Be it known that I, EDEMON P. LE BLANC, of Houma, in the parish of Terre Bonne and State of Louisiana, have invented a new and Improved Water-Elevator, of which the following is a specification:

My invention consists of a series of buckets moving about in a circular channel below a horizontal wheel which moves them, the channel at one side descending to a cavity, into which the water flows, and then rising to the place of exit for the water. The buckets are contrived so as to be raised off the bottom of the channel immediately after passing the exit, and lodged on the wheel, to be carried thereby without friction until they return to the point where they take the water again, when they are tripped and let fall again to the bottom of the channel.

The wheel is to be worked by animal power, but may be driven by any other means that may be at hand.

The machine is designed to afford a simple and cheap means of raising water short distances for irrigation, drainage, and the like.

Figure 1 is a plan view of the wheel and horizontal section of the supporting-frame. Fig. 2 is a transverse sectional elevation taken on the line $x\ x$ of Fig. 1, and Fig. 3 is a side elevation of one of the buckets.

Similar letters of reference indicate corresponding parts.

A represents a strong vertical shaft mounted on a circular disk or other suitable platform, B, and in an overhead beam, C, to revolve horizontally. This shaft carries a series of arms, D, which at the outer end may be connected by a band or hoop, E, of any kind, said arms being to revolve buckets F for running in the channel G, for raising water from the cavity thereof at H, when it flows in through opening I in the side, to the top of the ascending grade, out of said channel, where it flows away through passage J in the side of the channel. (Shown dotted.) The arms have a kind of yoke, K, rising up and inclining a little forward at the outer end, for holding the buckets, which have a bar or stem, L, rising up at the front side of the arm through the yoke, so as to be allowed to rest at the lower end on the bottom of the channel, and to rise and fall while being at the same time held upright and pushed along. The arm or stem of the buckets has a notch, M, near the upper end in the front side, and just in advance of the place where the water escapes there is a short and sharp incline, N, in the bottom of the channel, which throws the buckets up, so that they catch by the notch M on the top of the yoke, and hold them to be carried around without friction to the place for acting on the water again, when they are knocked off and let fall onto the bottom of the channel again by the stop O, against which the upper ends strike. The buckets are also connected by a tongue, R, to the next arm in advance for draft.

I have found by practical test that by a machine of this kind water may be elevated to a certain extent with less power than is required for doing the same work by pumps and the like water-elevators. The wheel has a projection, P, outside of the rim or band, to which the animal will be hitched for working it.

Having thus described my invention, I claim as new and desire to secure by Letters Patent—

1. The combination of the buckets F and wheel C D with the channel G, having an inclined way, with inlet and outlet passages, substantially as specified.

2. The combination of yoke K, notched stem L, and incline N in the channel with a bucket, F, and an arm of the wheel, substantially as specified.

3. The combination of stop O with the notched stems L of the buckets and the yokes K of the arms of the wheel, substantially as specified.

EDEMON PIERRE LE BLANC.

Witnesses:
  A. BOURG,
  CHAS. W. DU ROY.